United States Patent
Schmidt et al.

(10) Patent No.: US 8,916,635 B2
(45) Date of Patent: *Dec. 23, 2014

(54) FUNCTIONAL MATERIALS WITH REVERSIBLE CROSSLINKING

(75) Inventors: Friedrich Georg Schmidt, Haltern am See (DE); Simon Krause, Aschaffenburg (DE); Andre Hennig, Ingelheim (DE); Stefan Hilf, Rodenbach (DE); Christopher Barner-Kowollik, Stutensee (DE); Andrew John Inglis, NSW (AU); Leena Nebhani, Jaipur (IN); Ozcan Altintas, Karlsruhe (DE)

(73) Assignee: Evonik Roehm GmbH, Darmstadt (DE)

(*) Notice: Subject to any disclaimer, the term of this patent is extended or adjusted under 35 U.S.C. 154(b) by 203 days.

This patent is subject to a terminal disclaimer.

(21) Appl. No.: 13/577,932

(22) PCT Filed: Jan. 4, 2011

(86) PCT No.: PCT/EP2011/050043
§ 371 (c)(1),
(2), (4) Date: Aug. 9, 2012

(87) PCT Pub. No.: WO2011/101176
PCT Pub. Date: Aug. 25, 2011

(65) Prior Publication Data
US 2012/0309895 A1 Dec. 6, 2012

(30) Foreign Application Priority Data
Feb. 16, 2010 (DE) .................. 10 2010 001 987

(51) Int. Cl.
*C09J 4/00* (2006.01)
*C09J 5/00* (2006.01)

(52) U.S. Cl.
CPC .............. *C09J 4/00* (2013.01); *C09J 2205/302* (2013.01); *C09J 5/00* (2013.01)
USPC ............ 524/421; 524/521; 524/599; 525/451

(58) Field of Classification Search
CPC .......... C09J 4/00; C09J 5/00; C09J 2205/302; C09D 11/10; C09D 167/06; C08G 63/91
USPC ............................ 524/421, 521, 556; 525/451
See application file for complete search history.

(56) References Cited

U.S. PATENT DOCUMENTS

| 6,933,361 | B2 * | 8/2005 | Wudl et al. ................. 528/365 |
| 2005/0067373 | A1 | 3/2005 | Brock et al. |
| 2013/0323993 | A1 | 12/2013 | Schmitt et al. |
| 2014/0163165 | A1 | 6/2014 | Schmidt et al. |

FOREIGN PATENT DOCUMENTS

| EP | 2 166 030 | 3/2010 |
| JP | 2000 1529 | 1/2000 |
| JP | 2001-520660 | 10/2001 |
| WO | 2010 144774 | 12/2010 |
| WO | WO 2012/031824 A1 | 3/2012 |
| WO | WO 2012/065786 A1 | 5/2012 |

OTHER PUBLICATIONS

Inglis et al. "Ultrafast Click Conjugation of Macromolecular Building Blocks at Ambient Temperature", Communication, vol. 48, Issue 13, pp. 2411-2414, Mar. 16, 2009.*
Internatinal Search Report Issued Feb. 25, 2011 in PCT/EP11/050043 Filed Jan. 4, 2011.
Combined Chinese Office Action and Search Report issued Jun. 27, 2013 in Patent Application No. 201180007005.1.
Andrew J. Inglis, et al., "Ultrafast Click Conjugation of Macromolecular Building Blocks at Ambient Temperature", Angewandte Chemie International Edition, vol. 48, Issue 13, 2009, pp. 2411-2414.
U.S. Appl. No. 13/988,147, filed May 17, 2013, Hilf, et al.
U.S. Appl. No. 14/127,380, filed Dec. 18, 2013, Schmidt, et al.
U.S. Appl. No. 13/820,621, filed Mar. 4, 2013, Schmidt, et al.
U.S. Appl. No. 13/519,169, filed Jun. 26, 2012, Hilf, et al.
International Preliminary Report on Patentability and Written Opinion of the International Searching Authority issued Aug. 30, 2012, in PCT/EP2011/050043 (with English-language translation).
U.S. Appl. No. 14/360,442, filed May 23, 2014, Schmidt et al.
U.S. Appl. No. 14/363,055, filed Jun. 5, 2014, Schmidt et al.
Notification of Reasons for Refusal issued Jun. 9, 2014 in Japanese Patent Application No. 2012-553236 (with English translation).

* cited by examiner

Primary Examiner — Michael M Bernshteyn
(74) Attorney, Agent, or Firm — Oblon, Spivak, McClelland, Maier & Neustadt, L.L.P.

(57) ABSTRACT

The present invention relates to an innovative method for the reversible crosslinking of, for example, adhesives or coating materials. The reversible crosslinking method allows very rapid crosslinking even at room temperature and undoing of the crosslinks at higher temperatures, thereby regaining the capacity for thermoplastic processing and allowing the originally bonded substrates to be separated from one another again with ease. A particular aspect in this context is that a plurality of cycles of crosslinking and undoing of the crosslinks are possible with the present system.

17 Claims, 2 Drawing Sheets

FUNCTIONAL MATERIALS WITH REVERSIBLE CROSSLINKING

FIELD OF THE INVENTION

Figures 1, 2:
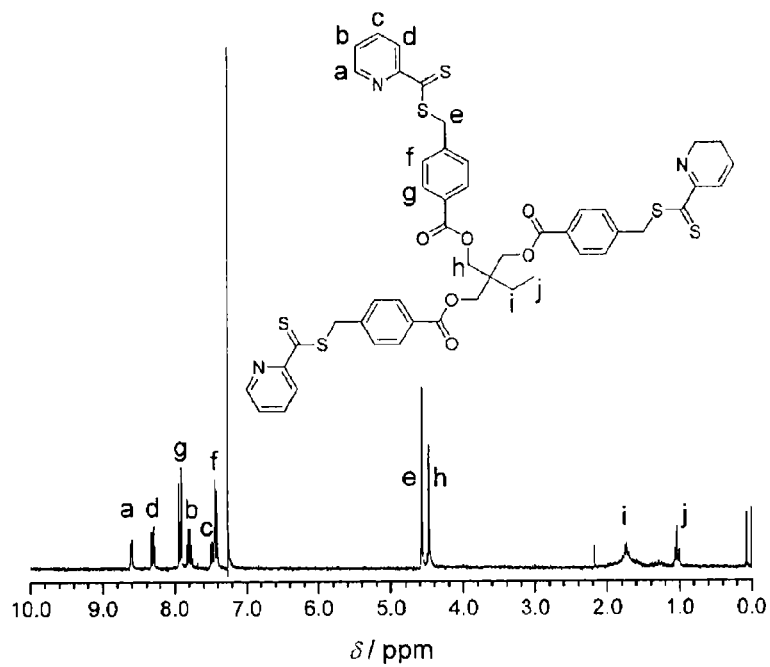

The present invention relates to an innovative method for the reversible crosslinking of, for example, adhesives or coating materials.

The reversible crosslinking method allows very rapid crosslinking even at room temperature and undoing of the crosslinks at higher temperatures, thereby regaining the capacity for thermoplastic processing and allowing the originally bonded substrates to be separated from one another again with ease. A particular aspect in this context is that a plurality of cycles of crosslinking and undoing of the crosslinks are possible with the present system.

PRIOR ART

Methods for the reversible crosslinking of polymers are of great interest for a broad field of applications. In adhesive applications, for example, diverse possibilities for the automotive industry or the semiconductors industry are described. In the context of the construction of machines, precision mechanical devices, or in the building industry as well, however, such adhesives are of interest. Besides adhesive applications, reversibly crosslinkable polymers may also be of interest in sealants, in coating materials such as varnishes or paints, or in the production of mouldings.

DE 198 32 629 and DE 199 61 940 describe processes where epoxy-, urea-, (meth)acrylate- or isocyanate-based adhesives are thermally decomposed. For this purpose, the adhesive formulation from DE 199 61 940 comprises a thermally unstable substance which is activated on heating. The adhesive layer in DE 198 32 629 is destroyed by a particularly high energy input. In both cases, deactivation of the adhesive layer is irreversible.

US 2005/0159521 and US 2009/0090461 describe an adhesive system which is crosslinked free-radically by exposure to actinic radiation and is destroyed by ultrasound. This process too, irreversibly, can no longer be implemented after one bonding cycle.

In EP 2 062 926, thermally labile, sterically hindered urea groups are incorporated in the chains of a polyurethane for adhesive applications; introduction of thermal energy causes destruction thereof, thereby reducing the adhesive bonding effect sufficiently to part the bond.

US 2009/0280330 describes an adhesive system which can apparently be used more than once and which has a two-layer construction. One layer is a shape memory layer, which may be thermally flexible or cured. The other layer is a dry adhesive, having different adhesive strengths as a function of its structure. Problems of such a system, however, are the two-layer structure, which is laborious to construct, and the anticipated residual tack after heating of the shape memory layer.

For a number of years, primarily within academia, methods for constructing block polymers have been researched under the generic heading of "click chemistry". In this chemistry, two different homopolymers with linkable end groups are combined with one another and are joined to one another by means, for example, of a Diels-Alder reaction, Diels-Alder-analogous reaction or other cycloaddition. The objective of this reaction is to construct thermally stable, linear and possibly high molecular mass polymer chains. Inglis et al. (Macromolecules 2010, 43, pp. 33-36), for example, describe, for this purpose, polymers with cyclopentadienyl end groups which are obtainable from polymers prepared by means of ATRP. These cyclopentadiene groups are able to react very rapidly in hetero-Diels-Alder reactions with polymers which carry electron-deficient dithioesters as end groups (Inglis et al., Angew. Chem. Int. Ed. 2009, 48, pp. 2411-2414).

The use of monofunctional RAFT polymers for linking with monofunctional polymers having a dihydrothiopyran group by way of a hetero-Diels-Alder reaction is found in Sinnwell et al. (Chem. Comm. 2008, 2052-2054). This method can be used to realize AB diblock copolymers. Rapid variants of this hetero-Diels-Alder linkage for the synthesis of AB block copolymers with a dithioester group which is present after a RAFT polymerization and with a dienyl end group are described in Inglis et al. (Angew. Chem. Int. Ed. 2009, 48, pp. 2411-14) and in Inglis et al. (Macromol. Rapid Commun. 2009, 30, pp. 1792-98). The analogous preparation of multiarm star polymers is found in Sinnwell et al. (J. Pol. Sci.: Part A: Pol. Chem. 2009, 47, pp. 2207-13).

U.S. Pat. No. 6,933,361 describes a system for producing transparent mouldings that can be repaired simply. The system is composed of two polyfunctional monomers which polymerize by means of a Diels-Alder reaction to form a highly dense network. One functionality in this system is a maleimide and the other functionality is a furan. The thermal switching of a highly dense network of this kind is used for its repair. Crosslinking takes place at temperatures above 100° C., the partial reverse reaction at even higher temperatures.

In Syrett et al. (Polym. Chem. 2010, DOI: 10.1039/b9py00316a), star polymers are described for use as flow improvers in oils. These polymers have self-healing properties that can be controlled by means of a reversible Diels-Alder reaction. For this purpose, monofunctional polymethacrylate arms are combined with polymethacrylates which in the middle of the chain, as a fragment of the initiator used, possess a group which can be used in a reversible Diels-Alder reaction.

Object

An object of the present invention is to provide a new reversible crosslinking method which can be used in different applications and across a broad formulation spectrum.

A particular object is to provide a reversible crosslinking method which can be switched a number of times, i.e. at least five times, without substantial loss of properties.

Furthermore, the object exists of providing a reversible crosslinking method which can be activated very rapidly at low temperatures and can be deactivated again under conditions which are benign for the formulation and any coated substrates.

Further objects, not stated explicitly, will become apparent from the overall context of the description, claims and examples hereinbelow.

Solution

The objects have been achieved through development of an innovative reversible crosslinking mechanism which can be used for different kinds of polymers independently of the formulating constituents such as binders. With the mechanism, new, reversibly crosslinkable formulations are also provided. Surprisingly it has been found that the stated objects can be achieved by means of a formulation which is crosslinkable by means of a Diels-Alder reaction or a hetero-Diels-Alder reaction.

The formulations of the invention comprise a component A, which has at least two dienophilic double bonds, and a component B, which has at least two diene functionalities. In addition, at least one of these two components, A or B, must have more than two, preferably at least three, of the functionalities in question, and at least one of the components, A or B, is present as a polymer. At the same time, the component having at least three functionalities may be a polymer, and the component having two functionalities may be a low molecular mass compound or an oligomer. In an alternative embodiment the component having at least three functionalities is an oligomer or low molecular mass compound and the component having two functionalities is a polymer. In a third, alternative embodiment, both components are polymers. In other alternative embodiments, both components have at least three functionalities, irrespective of which of the two components is a polymer. In an additional embodiment, both components are polymers having at least three functionalities.

Where the components A and B are each a polymer, these polymers may be different polymers or may be polymers which are the same, differing only in respect of the functional groups.

The polymers may be polyacrylates, polymethacrylates, polystyrenes, copolymers of acrylates, methacrylates and/or styrenes, polyacrylonitrile, polyethers, polyesters, polylactic acids, polyamides, polyesteramides, polyurethanes, polycarbonates, amorphous or partially crystalline poly-α-olefins, EPDM, EPM, hydrogenated or unhydrogenated polybutadienes, ABS, SBR, polysiloxanes and/or block, comb and/or star copolymers of these polymers. These star polymers may have more than 30 arms. The composition of the arms may vary and they may be composed of different polymers. These arms in turn, as well, may have branches. The comb polymers may have a block structure and may have variable comb arms.

The (meth)acrylates notation used below stands for alkyl esters of acrylic acid and/or of methacrylic acid.

A particular aspect of the invention is that the formulation is crosslinkable at room temperature and the crosslinking can be reversed to an extent of at least 50% at a higher temperature.

The dienophile is preferably a compound having a carbon-sulphur double bond, and the preferred crosslinking reaction, accordingly, is a hetero-Diels-Alder reaction. With particular preference the dienophile is a dithioester. With very particular preference the dienophile is a compound having the structure

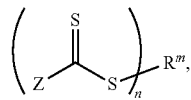

where Z is a strongly electron-withdrawing group, $R^m$ is a polyvalent organic group, preferably based on branched or linear alkylic, aromatic or a combination of alkylic and aromatic polyfunctional alcohols, polyfunctional halogenated compounds, polyfunctional carboxylic acids or polyfunctional amines. Alternatively $R^m$ may also be a polymer. The number of dithioester groups n is a number between 2 and 20, preferably between 2 and 10 and more preferably between 2 and 4.

In one preferred embodiment the group Z is a 2-pyridyl group, a phosphoryl group or a sulphonyl group. Also contemplated are cyano or trifluoromethyl groups, and also any other group Z which very strongly reduces the electron density of the C=S double bond and hence allows a rapid Diels-Alder reaction.

Surprisingly it has been found that these systems crosslink very rapidly even at room temperature, with optional addition of a crosslinking catalyst. Equally surprisingly it has been found that these networks can be returned into a thermoplastic again, simply and almost completely, even at very low temperatures of, for example, somewhat over 80° C. Moreover, it has been found, very surprisingly, that further crosslinking can take place thereafter, without further addition of crosslinker and/or catalyst, as for example by pure cooling. Furthermore, it is a particularly surprising effect that these cycles of crosslinking and conversion back into a thermoplastic can be carried out at least three times, preferably at least five times, without substantial loss of properties of the network.

In one preferred embodiment, component B is a difunctional polymer which is prepared by means of atom transfer radical polymerization (ATRP). In this case, functionalization with the diene groups takes place by means of a polymer-analogous substitution, or one carried out during termination, of terminal halogen atoms. This substitution may take place, for example, by addition of mercaptans functionalized with diene groups.

In the same preferred embodiment it is possible as component A to use a low molecular mass organic compound having 3 to 4 dithioester groups, and having, in accordance with the above embodiment, a group Z which strongly reduces the electron density of the C=S double bond.

A further aspect of the present invention is the process for reversible crosslinking. When this process is implemented, a formulation composed of at least two different components A and B is crosslinked at room temperature by means of a Diels-Alder reaction or a hetero-Diels-Alder reaction. In a second process step, at a higher temperature, at least 50%, preferably at least 90% and more preferably at least 99% of the crosslinks are undone again by means of a retro-Diels-Alder reaction or a retro-hetero-Diels-Alder reaction.

When this second process step is carried out, at a temperature above 80° C., preferably within 5 minutes, not more than within 10 minutes, at least 90%, preferably at least 95% and more preferably at least 98% by weight of the formulation becomes soluble again in a solvent suitable for the formulation prior to crosslinking. The crosslinking beforehand was such that, on 5-minute washing with the same solvent, not more than 5%, preferably not more than 2% and more preferably not more than 1% by weight of the formulation could be dissolved. The term "formulation" and all of the percentages associated with it relate in this case only to components A and B. Further formulating constituents, such as those, for example, which may be added in a coating or adhesive composition, are disregarded in this consideration. In the text below, the expression "formulation" in the context of this specification describes exclusively the components A and B and also an optional crosslinking catalyst. The expression "composition", in contrast, comprises components added additionally as well as the formulation. These additional components may be adjuvants selected specifically for the particular application, such as fillers, pigments, additives, compatibilizers, co-binders, plasticizers, impact modifiers, thickeners, defoamers, dispersing additives, rheology improvers, adhesion promoters, scratch resistance additives, catalysts or stabilizers, for example.

In accordance with the formulation already described, first components A and B, and optional further adjuvants, are combined in the process. Components A and/or B comprise at least one polymer from the list given earlier on above.

The crosslinking reaction may take place at room temperature within 10 minutes, preferably within 5 minutes, more preferably within 2 minutes, and very preferably within one minute. In order to accelerate the crosslinking it is possible to add a crosslinking catalyst after components A and B have been mixed. These crosslinking catalysts are generally strong acids such as trifluoroacetic acid or sulphuric acid, or strong Lewis acids such as boron trifluoride, zinc dichloride, titanium dichloride diisopropoxide or aluminium trichloride, for example.

In one alternative embodiment, crosslinking may also be accelerated without a catalyst, by thermal means, for example. In that case the activation temperature is below the temperature needed for the retro-(hetero)-Diels-Alder reaction.

In another alternative embodiment, the formulation, independently of the activation of the crosslinking reaction, comprises a further catalyst that lowers the activation temperature of the retro-Diels-Alder reaction or of the retro-hetero-Diels-Alder reaction. These catalysts may be, for example, iron or an iron compound.

The formulations and processes of the invention can be used in a wide variety of fields of application. The list below indicates certain preferred fields of application by way of example, without confining the invention in this respect in any form whatsoever. Such preferred fields of application are adhesives, sealants, moulding compounds, varnishes, paint, coatings, composite materials or inks.

These inks are, for example, compositions which are applied thermally and crosslink on the substrate. If conductive oligomers are used or additives for generating conductivity in general, an electrically conducting ink is obtained which can be processed, for example, by bubble-jet methods. Examples from the fields of application of varnishes, coatings and paint are compositions which in the non-crosslinked state are able to wet porous materials, for example, to particularly good effect and which, following the crosslinking reaction, produce highly cohesive materials.

Similar characteristics are of importance for adhesives, which ought to have high cohesion and are nevertheless intended readily to wet the surfaces of the materials to be bonded. A further application in the adhesive bonding area is, for example, a join which is needed only temporarily and must later be undone, of the kind that may occur in various production operations, for example, in automotive engineering or in mechanical engineering.

Another conceivable application is the bonding of components which, viewed over the lifetime of the product as a whole, are highly likely to be switched, and which therefore ought to be removable again very easily and without residue. One example of an application of this kind is the bonding of car windscreens.

One particular example of adhesives or sealants is their used in food packaging which opens or can be undone automatically during heating, such as in a microwave, for example.

An example of applications in the rapid prototyping sector for the crosslinking and decrosslinking materials described herein can be found in the area of FDM (fused deposition modelling) or in 3D printing by ink-jet methods with low-viscosity melts.

EXAMPLES

The weight-average molecular weights of the polymers were determined by means of GPC (gel permeation chromatography). The measurements were carried out using a Polymer Laboratories Inc. PL-GPC 50 Plus at 30° C. in tetrahydrofuran (THF) against a series of polystyrene standards (approximately 200 to $1 \cdot 10^6$ g/mol).

The NMR analyses were carried out on a Bruker AM 400 MHz spectrometer.

The ESI-MS analyses were made on an LXQ mass spectrometer (ThermoFisher Scientific, San Jose, Calif., USA), equipped with an atomizer-assisted electrospray ionization source. The instrument was calibrated in the 195-1822 m/z range using a caffeine standard, Met-Arg-Phe-Ala acetate (MRFA), and a mixture of fluorinated phosphazenes (Ultramark 1621) (all from Aldrich). A constant spray voltage of 4.5 kV and a dimensionless sweep gas flow rate of 2 and a dimensionless sheath gas flow rate of 12 were set. The capillary voltage of the tube lens, the offset voltage and the capillary temperature were set at 60 V, 110 V and 275° C., respectively. The LXQ was operated with an HPLC 1200 system (Agilent, Santa Clara, Calif., USA) consisting of a degasser (G1322A), a binary pump (G1312A) and an autosampler (G1367B), followed by a thermostated column chamber (G1316A). The separation was carried out on two size exclusion columns (Varian/Polymer Labs, Mesopore 250×4.6 mm, particle diameter 3 μm) with a pre-column (Mesopore 50×4.6 mm) at 30° C. THF with a flow rate of 0.30 ml·min$^{-1}$ was used as eluent. The mass spectrometer was coupled parallel to an RI detector with the column (G1362A with SS420x A/D) in an above-described construction. 0.27 ml·min$^{-1}$ of the eluent was passed through the RI detector and 30 μl·min$^{-1}$ into the electrospray source, with addition of a 100 μm solution of sodium iodide in methanol at 20 μl, through an HPLC syringe pump (Teledyne ISCO, Model 100DM). 20 μl of a polymer solution having a concentration of approximately 3 mg ml$^{-1}$ were applied to the GPC system.

Example 1

Synthesis of bis(bromo)polymethyl methacrylates 50 equivalents of methyl methacrylate (MMA), 1 equivalent of 1,2-bis(bromoisobutyryloxy)ethane, 0.105 equivalent of copper(I) bromide, 0.0125 equivalent of copper(II) bromide and 0.25 equivalent of 2,2'-bipyridine are placed in a 1 l three-neck flask with magnetic stirrer, nitrogen inlet and reflux condenser. Acetone is added to the mixture in an amount sufficient to give 500 ml of a 50% strength (by volume) solution. Oxygen present is removed by passing nitrogen through the solution for 40 minutes. The mixture is then heated to 50° C. in an oil bath under nitrogen. Polymerization is terminated after 2 hours by cooling in an ice bath and admission of atmospheric oxygen. The copper catalyst is removed by filtration on a short column packed with neutral alumina. The bromine-terminated poly(methyl) methacrylate (PMMA-Br$_2$) is precipitated twice from cold hexane, being dissolved in a little acetone in-between. The molecular weight is determined by means of GPC (THF): M$_n$=3500 g·mol$^{-1}$, PDI=1.2.

Example 2

Synthesis of bis(cyclopentadienyl)polymethyl methacrylate 1 equivalent of PMMA-Br$_2$ from Example 1, 12 equivalents of sodium iodide, 4 equivalents of tributylphosphane and 8 equivalents of nickelocene are dissolved in dried tetrahydrofuran (THF) under nitrogen in a 50 ml three-neck flask with magnetic stirrer, reflux condenser and dropping funnel, to form 25 ml of a solution which is 0.1 molar with respect to the polymer. The solution is stirred at room temperature for 12 hours, and the reaction solution is then purified by column chromatography on a short column packed with basic alumina. The cyclopentadienyl-terminated poly(methyl) methacrylate (PMMA-Cp$_2$) is precipitated twice from cold hexane. The double functionalization with cyclopentadienyl groups, which has taken place to an extent of more than 95%, is detected by ESI-MS. The m/z values are in each case approximately 29.6 mol$^{-1}$ smaller than the measurement for the product from Example 1.

Example 3

Synthesis of the Trifunctional Crosslinker

Stage 1: A solution of 1.64 g (10 mmol) of 2-(chloromethyl)pyridine hydrochloride (1), 2.46 g (15 mmol) of sodium phenylsulfinate, 0.53 g (2 mmol) of tetrapropylammonium bromide and 1.52 g (10 mmol) of 1,8-diazabicyclo-[5.4.0]undec-7-ene (DBU) in 10 ml of acetonitrile is stirred under reflux for 12 hours. Then all of the volatile constituents such as the solvent are removed under reduced pressure and the residue is dissolved in a little methylene chloride. The solution is extracted by shaking with sodium chloride solution, dried over magnesium sulphate and filtered and the solvent is removed under reduced pressure. The crude product (2) is obtained in quantitative amounts as a white solid and is used without further purification in the second stage.

Stage 2 (4-((pyridine-2-carbonothioylthio)methyl)benzoic acid hydrochloride) (3a):

A mixture of 1.9 g (8.51 mmol) of Stage 1 (2) and 0.78 g (24.3 mmol) of sulphur is stirred in 10 ml of tetrahydrofuran (THF) using a magnetic stirrer in a 50 ml round-bottom flask. Following addition of 2.72 g (24.3 mmol) of potassium tert-butoxide, the solution becomes dark brown. The mixture is stirred at room temperature for a further 12 hours. Then 2.6 g (12.15 mmol) of 4-bromomethylbenzoic acid in 10 ml of THF are added slowly dropwise. The solution is stirred for a further 5 hours. During this time, the solution takes on a reddish pink coloration. The solution is extracted in dilute hydrochloric acid and purified by shaking with methylene chloride. The crude product (3) is purified, finally, by extraction with acetone.

Stage 3 (5): 0.072 g (0.536 mmol) of 1,1,1-tris(hydroxylmethyl)propane (TMP (4)), 0.118 g (0.402 mmol) of 4-(dimethylamino)pryidinium 4-tosylate (DPTS) and 0.025 g (0.201 mmol) of dimethylaminopyridine (DMAP) are dissolved in 10 ml of methylene chloride. 0.581 g (2.01 mmol) of the product from Stage 2 (3) is dissolved in 3 ml of dimethylformamide (DMF) and added slowly dropwise to the solution. After 10 minutes of stirring, 0.622 g (3.01 mmol) of dicyclohexylcarbodiimide (DCC), in solution in 2 ml of dichloromethane, is added. The reaction solution is stirred at room temperature overnight. The product solution is filtered, volatile constituents are removed under reduced pressure, and the crude product (5) of Stage 3 is purified by column chromatography over silica with a mixture of hexane and ethyl acetate (volume ratio 6 to 4). The product (5) is obtained as a red solid. Detection of the successful synthesis of the expected trifunctional crosslinker was carried out by means of $^1$H and $^{13}$C NMR spectroscopy and by means of ESI-MS measurements. The latter gave an average molar weight for the product, m/z$_{exp}$, of 970.08 g·mol$^{-1}$. The theoretical molecular weight of the crosslinker, m/z$_{theor}$, is 970.12 g·mol$^{-1}$.

Example 4

Reversible Crosslinking

Stage 1: Crosslinking reaction: PMMA-Cp$_2$ from Example 2 and the trifunctional crosslinker from Example 3 are mixed in a molar ratio of 2 to 3 and dissolved in chloroform to give a solution which is 0.05 molar with respect to the polymer. 1.5 molar equivalents of trifluoroacetic acid (TFA) are added and the mixture is shaken at room temperature for 10 minutes. The solid formed is analysed immediately by GPC. The solvent is then removed together with excess crosslinker as far as possible by decanting.

Stage 2: Undoing of the crosslinks: The crosslinked polymer from Stage 1 is admixed with toluene and shaken for 5 minutes. The toluene phase remains colourless. It is then heated to more than 80° C. for 5 minutes. Within this time, the colourless toluene phase is observed to take on a pink coloration. The colour change is attributable to the liberation of the trifunctional crosslinker. The latter can be isolated from the toluene phase and detected by means of thin-layer chromatography or by means of NMR spectroscopy. The solution is analysed by GPC.

Stage 3: Second crosslinking reaction: The toluene from Stage 2 is removed under reduced pressure and the solid which remains is dissolved in chloroform. The fact that the solid can be dissolved almost completely is a clear indication that almost complete decrosslinking has taken place in Stage 2. The crosslinking is carried out in analogy to the first crosslinking reaction in Stage 1. Analysis of the network takes place again by means of direct GPC measurement.

Figure 3:
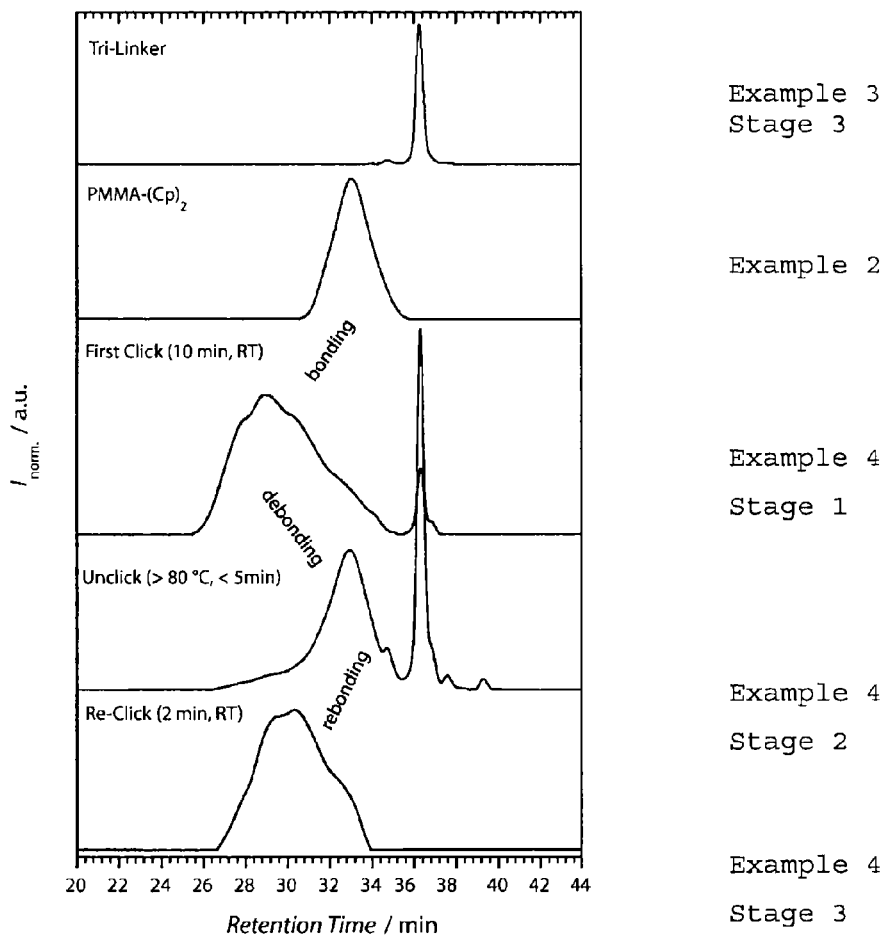

The drawings FIGS. 1 to 3

FIG. 1, for better illustration, shows the synthesis of the exemplary crosslinker from Example 3. The notations of Stage 1 to 3 correspond to the example. The numbers shown in parentheses are likewise found in the example. Furthermore, the following abbreviations are found in the drawing: DBU: 1,8-diazabicyclo[5.4.0]undec-7-ene (3): (4-((pyridine-2-carbonothioylthio)methyl)benzoic acid R.T.: room temperature base: potassium tert-butoxide DCC: dicyclohexylcarbodiimide DMAP: dimethylaminopyridine DPTS: 4-(dimethylamino)pyridinium-4-tosylate DMF: dimethylformamide DCM: dichloromethane Also listed are the following compounds: PhSO$_2$Na (sodium phenylsulfinate); Pr$_4$NBr (tetrapropylammonium bromide); CH$_3$CN (acetonitrile); S$_8$ (sulphur); BrCH$_2$C$_6$H$_5$COOH (4-bromomethylbenzoic acid).

FIG. 2 shows the $^1$H NMR spectrum of the trifunctional crosslinker (5) from Example 3. The letters serve for assignment of the signals to the respective protons of the crosslinker (5).

FIG. 3 shows the GPC analyses for the crosslinking tests, and the GPC eluogram of the PMMA-Cp$_2$ from Example 2, and also of the trifunctional crosslinker from Example 3, Stage 3. Also shown are the crosslinking/decrosslinking tests from Example 4—Stage 1 (bonding), Stage 2 (debonding) and Stage 3 (rebonding). These eluograms show the efficient reversible dissolution of the network and the re-crosslinking of the system.

The invention claimed is:

1. A formulation, comprising:
   a component A comprising two dienophilic double bonds, and
   a component B comprising two diene functionalities,
   wherein A, B, or both comprises more than two functionalities,
   A, B, or both is a polymer,
   the formulation is reversibly crosslinkable at room temperature, the formulation is crosslinkable via a Diels-Alder reaction or a hetero-Diels-Alder reaction, and component A comprises a dienophile comprising a carbon-sulphur double bond.

2. The formulation of claim 1, wherein the dienophile is a dithioester.

3. The formulation of claim 1, wherein the dienophile is a compound having a structure:

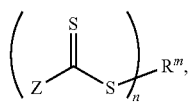

wherein Z is an electron-withdrawing group,

R'" is a polyvalent organic group or a polymer, and n is a number between of from 2 to 20.

4. The formulation of claim 3, wherein Z is a 2-pyridyl group and n is a whole number of from 2 to 4.

5. The formulation of claim 1, wherein components A and B are each a polymer, and components A and B are optionally identical or are optionally different polymers.

6. The formulation of claim 1, wherein A, B, or both comprise three functionalities.

7. The formulation of claim 1, wherein component B is a difunctional polymer prepared via ATRP and a functionalization with the diene functionalities is through substitution of terminal halogen atoms.

8. The formulation of claim 3, wherein component A is a low molecular mass organic compound comprising from 3 to 4 dithioester groups, and Z is a 2-pyridyl group, a phosphoryl group, or a sulphonyl group.

9. A process for reversible crosslinking, comprising:

crosslinking the formulation of claim 1 via a Diels-Alder reaction or hetero-Diels-Alder reaction at room temperature, and undoing at least 50% of crosslinks at a temperature higher than room temperature by means of a retro-Diels-Alder reaction or retro-hetero-Diels-Alder reaction.

10. The process of claim 9, wherein, at a temperature above 80° C., at least 90% of the formulation is soluble in a solvent suitable for the formulation prior to crosslinking.

11. The process of claim 9, wherein the crosslinking is within 2 minutes after mixing components A and B.

12. The process of claim 9, wherein the crosslinking is within 2 minutes after mixing components A and B with a crosslinking catalyst.

13. The formulation of claim 1, wherein each polymer for A, B, or both is at least one member selected from the group consisting of a polyacrylate; a polymethacrylate; a polystyrene; a copolymer of any combination of components selected from the group consisting of an acrylate, a methacrylate, and a styrene; a polyacrylonitrile; a polyether; a polyester; a polylactic acid; a polyamide; a polyesteramide; a polyurethane; a polycarbonate; an amorphous or partially crystalline poly-α-Olefin; EPDM; EPM; hydrogenated or unhydrogenated polybutadiene; ABS; SBR; a polysiloxane; any block, comb, or star copolymer thereof; or any combination of a block, comb, or star copolymer thereof.

14. The process of claim 10, wherein, within 5 minutes, at least 90% of the formulation is soluble in a solvent suitable for the formulation prior to crosslinking.

15. The process of claim 9, wherein component A, component B, or both comprise three functionalities.

16. The process of claim 10, wherein component A, component B, or both comprise three functionalities.

17. An adhesive, sealant, molding compound, varnish, paint, coating, ink, or composite material, comprising the formulation of claim 1.

* * * * *